United States Patent
Zogg et al.

(10) Patent No.: US 9,638,522 B2
(45) Date of Patent: May 2, 2017

(54) TOTAL STATION HAVING SCANNING FUNCTIONALITY AND SELECTABLE SCANNING MODES

(71) Applicant: Leica Geosystems AG, Heerbrugg (CH)

(72) Inventors: Hans-Martin Zogg, Uttwil (CH); Patrik Lengweiler, Maienfeld (CH); Robert Natau, St. Gallen (CH); Reto Stutz, Berneck (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 278 days.

(21) Appl. No.: 14/245,710

(22) Filed: Apr. 4, 2014

(65) Prior Publication Data

US 2014/0300892 A1 Oct. 9, 2014

(30) Foreign Application Priority Data

Apr. 5, 2013 (EP) ..................................... 13162569

(51) Int. Cl.
| | | |
|---|---|---|
| *G01N 21/00* | (2006.01) | |
| *G01C 15/00* | (2006.01) | |
| *G01B 11/14* | (2006.01) | |

(52) U.S. Cl.
CPC ............ *G01C 15/002* (2013.01); *G01B 11/14* (2013.01)

(58) Field of Classification Search
CPC ..................................................... G01B 11/14
USPC ............................................................ 356/73
See application file for complete search history.

(56) References Cited

U.S. PATENT DOCUMENTS

| 6,061,644 A | 5/2000 | Leis | |
|---|---|---|---|
| 2002/0065620 A1* | 5/2002 | Drinkard | G01R 13/345 702/66 |
| 2006/0244746 A1* | 11/2006 | England | G06T 11/60 345/419 |

(Continued)

FOREIGN PATENT DOCUMENTS

| CN | 2326935 Y | 6/1999 |
|---|---|---|
| CN | 1283272 A | 2/2001 |
| EP | 1 342 989 A2 | 9/2003 |

OTHER PUBLICATIONS

European Search Report dated Sep. 5, 2013 as received in Application No. EP 13 16 2569.

(Continued)

*Primary Examiner* — Hina F Ayub
(74) *Attorney, Agent, or Firm* — Maschoff Brennan

(57) ABSTRACT

A total station including an electro-optical distance measuring unit and a scanning functionality is disclosed. The total station may include an analysis unit for analysis of the registered measuring signal data and conversion thereof into scanning points for a point cloud, whereby a point cloud having the scanning points can be generated. The distance measuring unit may be configured in such a manner that the distance measurement can be carried out by means of runtime measurement and/or waveform digitizing (WFD). In addition, the total station may have a program storage unit which may provide at least two scanning modes, wherein the at least two scanning modes differ at least in a measuring rate such as, for example, in the number of scanning points per unit of time.

18 Claims, 9 Drawing Sheets

(56) References Cited

U.S. PATENT DOCUMENTS

| | | | | |
|---|---|---|---|---|
| 2006/0286772 | A1* | 12/2006 | Pearl | G01N 1/32 |
| | | | | 438/460 |
| 2006/0288756 | A1* | 12/2006 | De Meurechy | G01N 17/006 |
| | | | | 73/1.01 |
| 2007/0247614 | A1* | 10/2007 | Puah | G01N 21/95684 |
| | | | | 356/73 |
| 2008/0158144 | A1* | 7/2008 | Schobben | G06F 1/3203 |
| | | | | 345/156 |
| 2010/0026982 | A1* | 2/2010 | Kludas | G01C 15/00 |
| | | | | 356/4.01 |
| 2010/0070229 | A1 | 3/2010 | Svanholm et al. | |
| 2012/0224164 | A1* | 9/2012 | Hayashi | G01C 15/002 |
| | | | | 356/3 |
| 2013/0043751 | A1* | 2/2013 | Yuan | E05B 47/026 |
| | | | | 310/80 |
| 2013/0312553 | A1* | 11/2013 | Jan | F16H 57/12 |
| | | | | 74/89.17 |
| 2013/0319122 | A1* | 12/2013 | Epureanu | G01B 11/14 |
| | | | | 73/655 |
| 2014/0080223 | A1* | 3/2014 | Tunheim | G01N 21/954 |
| | | | | 436/164 |

OTHER PUBLICATIONS

Hug et al., "Litemapper-5600—A Waveform-Digitizing Lidar Terrain and Vegetation Mapping System" International Archives of Photogrammetry, Remote Sensing and Spatial Information Sciences, vol. XXXVI, Oct. 2004, pp. 24-29.

* cited by examiner

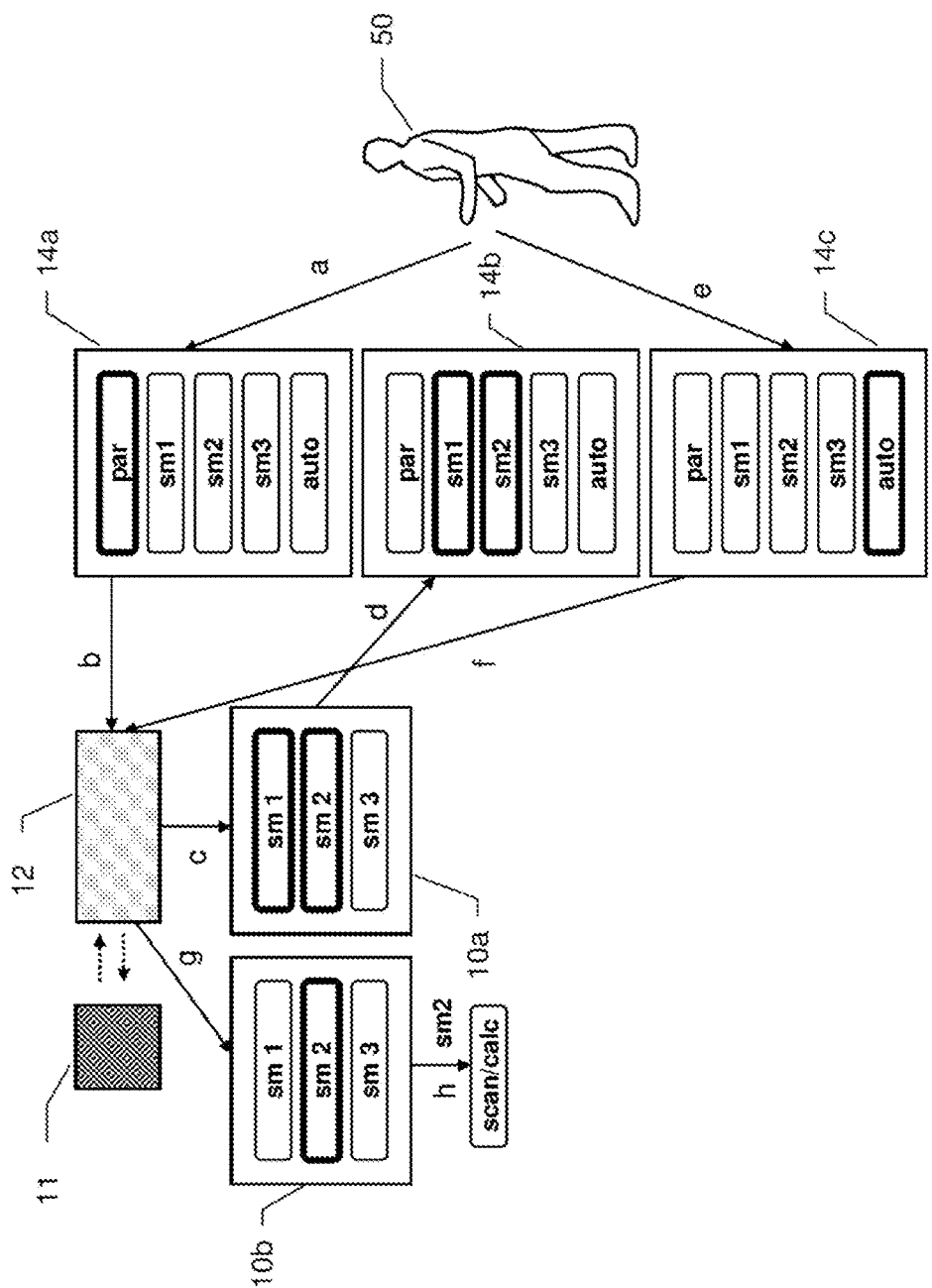

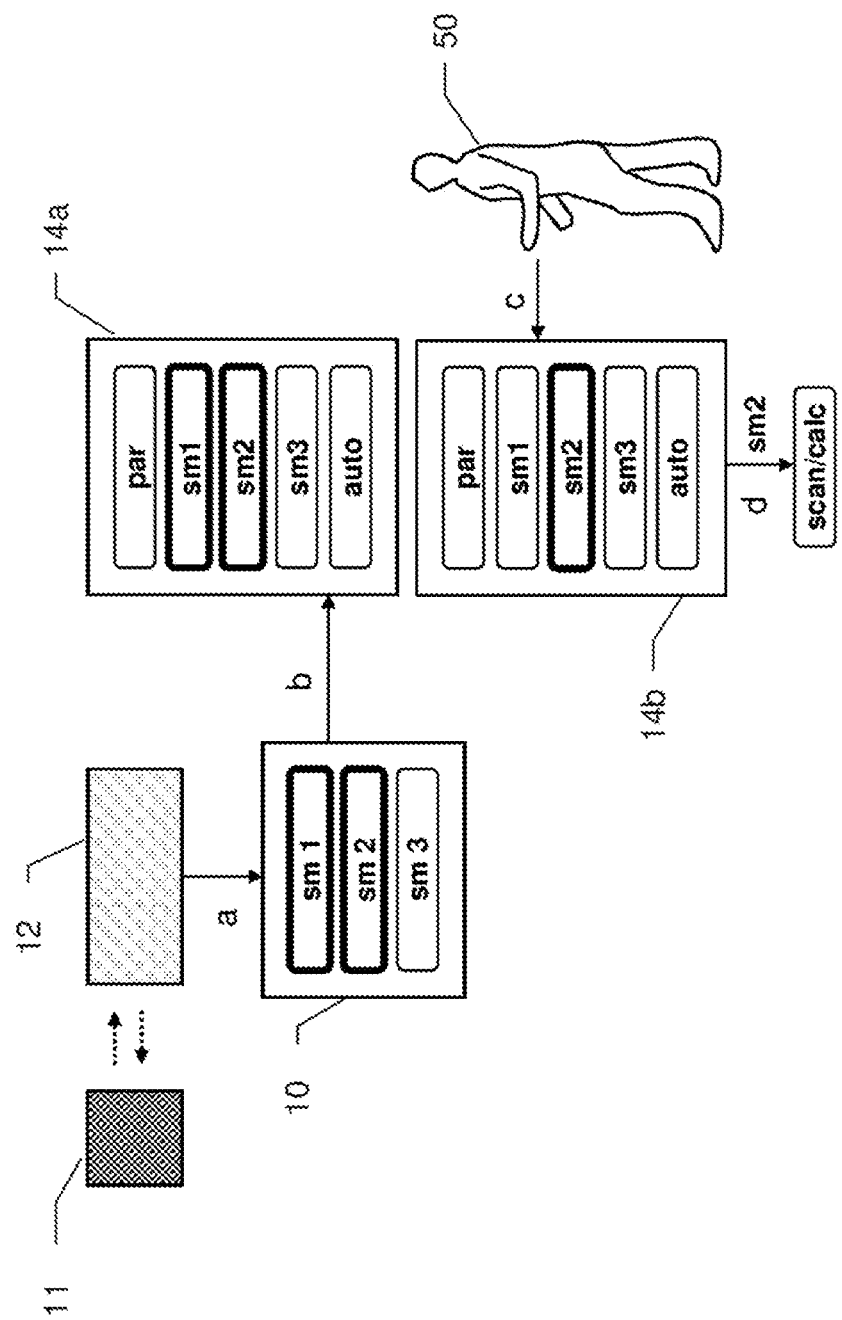

TOTAL STATION HAVING SCANNING FUNCTIONALITY AND SELECTABLE SCANNING MODES

FIELD OF THE INVENTION

Embodiments of the invention relate to a total station, a method, and a computer program product.

BACKGROUND

Modern total stations typically have a compact and integrated construction, wherein usually in addition to the aiming and/or targeting apparatus, a distance measuring unit, which is laid out coaxially to the aiming and/or targeting apparatus, and also computer, control, and storage units are provided in a device. Furthermore, in general a motorization of the aiming and/or targeting apparatus is integrated. Total stations known from the prior art can furthermore have a radio data interface for establishing a radio connection to external peripheral components, for example, to a handheld data acquisition device, which can be designed in particular as a data logger or field computer.

A telescopic sight or an optical telescope is typically provided as the aiming and/or targeting apparatus. The telescopic sight is generally rotatable about a vertical pivot axis and a horizontal tilt axis in relation to a base of the total station, so that the telescope can be aligned on the point to be surveyed by pivoting about at least one of the two axes.

Scanning functionalities can additionally be integrated in total stations as auxiliary functions. The scanning functionality can be used, for example, to register the topography of an object or its surfaces, for example, those of a building. For this purpose, the object or its surface is scanned step-by-step using a laser beam of the distance measuring unit integrated in the total station. For every point targeted by the laser beam, the spatial position of the surface point is registered by measuring the distance to the surface point aimed at by way of the distance measuring unit and linking this measurement to the angle information of the laser emission.

Modern total stations have more rapid scanning functionalities in comparison to those devices of early generations, wherein more rapid and precise alignment of the aiming unit can be achieved using improved control motors (which are more rapidly activatable and act more rapidly, and are higher in performance). It is thus possible to register a plurality of points in a predefined scanning region in a relatively short time and to generate a corresponding point cloud.

Document US 2010/0070229 A1 discloses a total station having scanning functionality and a scanning method for surveying a scanning region of an object. The scanning method comprises the division of the scanning region into subregions adjacent to one another, wherein each subregion has a defined number of points to be surveyed. During the surveying of points in a new subregion, respective items of point information of at least one corresponding measuring point, which was surveyed in a previously surveyed, adjacent subregion, are used. In this manner, a high measurement precision and a rapid large-area surface survey are to be made possible.

SUMMARY

Embodiments of the invention provide a total station and a scanning method, which may permit rapid, precise, and large-area surface surveying of an object, and are very user friendly and simple to handle at the same time.

The total station has a base, a structure, which is arranged on the base and is pivotable in relation to the base about a pivot axis, and an aiming unit, which is arranged in the structure and is pivotable in relation to the structure about a tilt axis, which is perpendicular to the pivot axis. Furthermore, the total station comprises an electro-optical distance measuring unit for measuring the distance to points on an object. The distance measuring unit has an emission unit, for example, a laser light source, for emitting pulsed measuring radiation, which can be emitted by means of the aiming unit, and also a detector for receiving the measuring radiation reflected at the points on the object. The detector registers the reflected measuring radiation in the form of measuring signals. In addition, the total station has an angle measuring unit, for example, an angle encoder, for determining the angular position in the pivot axis and tilt axis, and a control and processing unit for data processing and control of the total station. Furthermore, the total station has a scanning functionality, which controls the distance measuring apparatus and the aiming unit by means of the control and processing unit in such a manner that the distance measurement is executable in a scanning manner, wherein the measuring signals thus obtained can be analyzed within the scanning functionality by means of an analysis unit by ascertaining a distance to the object from the measuring signals and assigning two spatial angles (vertical and horizontal corresponding to the angular position of the aiming unit) to this distance, so that the measuring signals are converted into a scanning point. Finally, a point cloud which represents the object can be generated from these scanning points.

According to the invention, the distance measuring unit of the total station is configured in such a manner that the distance measurement can be carried out by means of runtime measurement and waveform digitizing. In addition, the total station has a program storage unit which provides at least two scanning modes, wherein the at least two scanning modes differ at least in their measuring rate, i.e., in the number of ascertained scanning points per unit of time. The measurement precision, i.e., the number of the accumulated measuring signals, from which a distance is ascertained for a scanning point, is higher the lower the measuring rate. The distances to an object to be surveyed can also be selected to be greater the lower the measuring rate. A constant pulse rate of the measuring radiation, which is typically used in scanning functionalities in total stations, is presumed.

The waveform digitizing (WFD) is based on the combination of two fundamental principles for signal detection typically used in distance measurement. The first fundamental principle is based on measuring signal detection on the basis of the threshold value method and the second fundamental principle is based on signal scanning having signal processing connected downstream for the identification and chronological location determination of the signal. The runtime and therefore the distance between a measuring pulse emitted by the emission unit and a target pulse (a measuring pulse reflected from the target object and detected by the detector) follow, for example, from the time interval of the apex points of the two pulses, wherein the pulses are sampled similarly as in phase meters. By means of a total station according to the invention using WFD, more precise and rapid distance measurement and therefore shortening of the total scanning duration for the same scanning region are achievable in relation to the total stations known in the prior art.

In a preferred embodiment of the invention, in the scope of the scanning functionality, the aiming unit is pivotable about the tilt axis and/or pivot axis in such a manner that the emitted measuring radiation can be continuously aligned at least in a pivotable manner about one of the two axes. By way of the continuous pivoting or alignment of the measuring radiation, the measuring speed may be increased in relation to conventional scanning methods which operate step-by-step, and therefore the total scanning duration may be reduced. Possibly resulting disturbances in the target pulse (blurring of the incident and reflected pulse on the surface of the object as a result of the continued scanning movement during the incidence) can be compensated for in the case of known distance to the object by an angular velocity of the aiming unit—by means of which the measuring radiation is guided over the object—adapted to this distance. If, in addition to the distance to the object, further parameters, such as total scanning duration or resolution, have been predefined by the user, for example, an angular velocity which is optimized with regard to these parameters and the distance is thus set by the control and processing unit.

The WFD also provides a contribution to the improved ability to analyze these "blurred" signals.

In a further preferred embodiment of the invention, at least two scanning modes are provided by means of the program storage unit; selected from a group of scanning modes at least containing:

scanning mode 0 having a measuring rate of 100,000 scanning points per second, wherein a distance is ascertained 100,000 times per second from the respective measuring signals accumulated within a time period of 0.00001 seconds and this is converted into one scanning point (distance and spatial angle)

scanning mode 1 having a measuring rate of 1000 scanning points per second, wherein a distance is ascertained 1000 times per second from the respective measuring signals accumulated within $1/1000$ of a second and this is converted into one scanning point (distance and spatial angle);

scanning mode 2 having a measuring rate of 250 scanning points per second, wherein a distance is ascertained 250 times per second from the respective measuring signals accumulated within $1/250$ of a second and this is converted into one scanning point (distance and spatial angle);

scanning mode 3 having a measuring rate of 62 scanning points per second, wherein a distance is ascertained 62 times per second from the respective measuring signals accumulated within $1/62$ of a second and this is converted into one scanning point (distance and spatial angle);

scanning mode 4 having an automatic adaptation of the measuring rate to the currently measured distance to the object.

Typically the horizontal and the vertical spatial angle for the scanning point are stored as the spatial angle, which scanning point represents the middle of the route which the measuring beam covers during the time period during which the registered measuring signals for the distance measured value are accumulated. For the above-mentioned scanning modes 1 to 3, the fixed pulse rate of the emitted measuring radiation is preferably 1,000,000 to 2,000,000 pulses per second. However, other fixedly predefined pulse rates of the emitted measuring radiation are also conceivable, wherein a selection of such fixed pulse rates can also be stored in the program storage unit. The above indicated scanning modes 0 and 1 represent scanning modes at this pulse rate which permit a very rapid scan in regard to the total scanning duration, but are less precise because of this, of course, and are also only suitable for relatively short distances to the object of up to 150 or 200 m (scanning mode 0) or 300 or 350 m (scanning mode 1), respectively. Scanning mode 2 represents an optimized solution with respect to scanning speed and object distance and provides reasonable, i.e., sufficiently precise results at object distances up to 400/450 m; and scanning mode 3 represents an optimized solution with respect to object distance and precision and is reasonably usable up to approximately 500 m or 600 m. Of course, the reflectivity of the surface of the object also plays a role with respect to the object distance. In the case of smooth surfaces having good reflection, the distance can be selected to be somewhat greater than in the case of poorly reflective and/or rough surfaces.

In addition to the above-described scanning modes, of course, still further scanning modes can be stored in the program storage unit, which provide further measuring rates, for example, such as a measuring rate of greater than 100,000 scanning points per second, of 50,000 scanning points per second, 500 scanning points per second, a measuring rate of 125 scanning points per second, or for measuring individual points or very distant objects, for example, 1 km away, a measuring rate of one scanning point per second, which corresponds to a measurement in the "stop and go" (single point measurement) method. It can also be provided that the user himself programs a measuring rate deviating from these measuring rates and stores it in the program storage unit as a scanning mode. Other scanning modes which predefine, for example, various, fixedly predefined or also dynamic resolution rates, or various fixedly predefined resolution rates in combination with defined fixedly predefined measuring rates can also be stored in the program storage unit.

As a further scanning mode, a measurement having constant resolution, i.e., having constant measuring point density per measured scanning route or measured area, can also be stored in the program storage unit. In this scanning mode, a continuous adaptive adaptation of the angular velocity of the aiming unit is performed depending on the distance to the object to be surveyed, so that the measuring point density remains constant for an area to be scanned during the scanning procedure, also in the event of changing distances to the object, for example, in the event of a complex building structure. The distance to the object to be surveyed is determined continuously (with each measuring pulse) or repeatedly at short intervals (every third, fifth, tenth, etc. measuring pulse depending on the pulse rate) during the scan.

A standard scanning region can also be stored in the program storage unit. This is advantageous in measuring devices, using which an identical scanning region is frequently to be surveyed (for example, frequent full-dome recordings or 180° scans). If a scanning region is not specified by the user, the control and processing unit can always use this standard scanning region. Various frequently used scanning regions can also be stored in the program storage unit and provided to the user, for example, when he does not specify a scanning region himself, so that he selects one thereof. It is also conceivable that the user defines a scanning region as the standard scanning region from the proposed scanning regions, that he defines scanning regions himself and stores them as selectable scanning regions in the program storage unit, or also that he programs a standard scanning region himself and stores it in the program storage unit.

In order that the user can define scanning modes himself, in a further embodiment, operating unit and program storage unit are designed accordingly. Combinations of parameters which are frequently required by the user for his special purposes in a scan can be programmed by him in this way in the form of a separate scanning mode and stored in the program storage unit.

Since the total station according to the invention executes continuous scanning movements if a high efficiency is to be achieved, stronger "blurring" of the incident and reflected pulses on the surface of the object occurs with increasing distance to the object to be surveyed or with increasing scanning speed. In visual terms, instead of a "point-shaped measuring spot", on which a certain number of laser pulses, the measuring signals of which are accumulated for a scanning point, are incident and from which they are reflected, an oblong, rather "oval measuring spot" arises on the object, the extension of which (=blurring in centimeters) becomes greater the farther away the object is from the total station or the more rapid the continuous scanning movement of the laser beam is (=angular velocity of the aiming unit). This results in a reduction of the measurement precision for the corresponding scanning point. According to the invention, the control and processing unit is therefore configured in such a way that the angular velocity of the aiming unit is adapted to the distance or the scanning mode which can reasonably be used at a specific distance. Thus, for example, at a measuring rate of 1000 scanning points per second (scanning mode 1, suitable for distances up to 300 m/350 m), the angular velocity is more rapid than at a measuring rate of 250 scanning points per second (scanning mode 2, suitable for distances up to 400 m/450 m). Furthermore, the and processing unit is configured in such a manner that it makes available only reasonable scanning modes to the user from the scanning modes provided by the program storage unit, i.e., scanning modes having "blurring" which still result in reasonable distance and spatial angle data for a scanning point at the expected distance to the object.

For example, the following values have proven to be reasonable limiting values for the blurring (and therefore sufficient precision or resolution) for a constant measuring distance of 200 m:
for a measuring rate of 1000 Hz, i.e., 1000 scanning points per second, blurring of approximately 25 cm;
for a measuring rate of 250 Hz, blurring of approximately 17 cm; and
for a measuring rate of 62 Hz, blurring of approximately 12 cm to 13 cm.

As already explained above, blurring is understood as the route which the measuring beam covers at the predefined measuring rate respectively in a time period in which measuring signals for a distance measured value are accumulated.

For smaller distances, smaller limiting values for the blurring correspondingly result for the various measuring rates (scanning modes), for example, for 1000 Hz at a distance of 100 m, blurring of approximately 13 cm.

If at least two scanning modes of the scanning modes provided in the program storage unit have been made available to the user, the user selects one scanning mode. The selection of a specific scanning mode by the user can be performed, for example, depending on the distance to the object to be scanned and/or depending on specific requirements for the scanning procedure, for example, with respect to measuring speed or measurement precision.

In order that the user knows in each case the scanning mode in which the total station operates, this information can be displayed on a display screen of an operating unit of the total station, either automatically or upon request by the user.

In a further preferred embodiment of the invention, the total station has an operating unit for the input of at least one parameter, wherein the parameter can be the following: an estimated or measured distance to the object, a pulse rate of the measuring radiation, a scanning region, an angular velocity of the aiming unit, a resolution, or a total scanning duration. The terms "total scanning duration" and "scanning duration" are used synonymously here and comprise a time from measurement beginning, i.e., from the beginning of the registration of measuring signals, up to the end of the measurement.

In one embodiment of the invention, the control and processing unit, which is coupled to the operating unit and the program storage unit, is configured in such a manner that at least one scanning mode of the at least two scanning modes provided by the program storage unit is automatically made available depending on the input at least one parameter. This means, by means of the control and processing unit, of the scanning modes provided by the program storage unit, the scanning modes which are reasonable together with these parameters are determined, i.e., the scanning modes which can achieve a reasonable scanning result under these parameters, that is to say a scanning result having sufficient measurement precision and/or resolution. A reasonable result in this sense is distinguished, for example, by a sufficiently large number of analyzable measuring signals and by a low range noise. The range noise is reasonably less than the smallest object to be resolved (for example, range noise in the submillimeter range). Only these scanning modes are then made available to the user for a further selection. Depending on the input parameters, either multiple selectable scanning modes can be made available to the user, or it is also possible, however, that only one scanning mode is made available to the user. It is also conceivable that none of the scanning modes provided by the program storage unit delivers a satisfactory scanning result as a result of the input parameters. For this case, it is possible that the control unit is configured in such a way that the user receives a corresponding message via the operating unit, for example, to then carry out an adaptation of one or more parameters.

In a further preferred embodiment of the invention, an automatic selection functionality can also be selected by means of the operating unit, in addition to the input of the at least one parameter by the user and the selection of a scanning mode. The selection of the scanning mode by the user can either be performed from the at least two scanning modes provided by the program storage unit, i.e., no preselection of the selectable scanning modes occurs. The selection of the scanning mode can, however, also be performed from the scanning modes which are selected and made available to the user by means of the control and processing unit from the scanning modes provided by the program storage unit. The latter is the case, for example, in the event of preceding input of one or more parameters by the user by means of the operating unit or the determination of a parameter by the device, for example, the distance, by means of the distance measuring unit.

According to the invention, the user can additionally select the automatic selection functionality by means of the operating unit, so that the device automatically carries out the selection of the scanning mode. The automatic scanning functionality can either be selected beforehand or after specific reasonable scanning modes from the scanning modes provided by the program storage unit have been made available to the user, wherein the selection of the reasonable scanning modes which are made available to the user from the scanning modes provided by the program storage unit is performed on the basis of an optimization with respect to distance to the object, total measuring duration, measurement precision, and resolution. The angular velocity of the aiming unit is automatically optimized by the control and processing unit respectively depending on distance for each scanning mode via an algorithm. Only those scanning modes are made available which still provide sufficiently precise results (see above) under these optimization criteria with respect to blurring (measurement precision and resolution).

If the user delegates the selection of the scanning mode to the total station, the control and processing unit of the total station thus selects, either directly from the scanning modes provided by the program storage unit or from the scanning modes already made available to the user as reasonable scanning modes, that scanning mode which best meets the competing requirements with respect to total measuring duration, measurement precision, resolution, and distance under the given conditions. In the case of a very remote object to be surveyed, for example, the control and processing unit in the above-mentioned example would preferably select the scanning mode 3, in which 16 times more measuring points are accumulated to obtain one scanning point than in scanning mode 1. In contrast, in the case of a nearby object to be surveyed, the scanning mode 1 would preferably be selected, since this mode requires a shorter total scanning duration at short distance, but still delivers sufficient precision of the results. Therefore, optimization takes place with regard to measuring distance, total scanning duration, and measurement precision.

If the automatic selection function is selected before or at the beginning of the scanning procedure, the selection of the scanning mode is executed fully automatically. The object of interest is scanned with very coarse resolution in a type of prescan and from this scan, the device then automatically ascertains the parameters necessary for determining the suitable scanning mode, e.g., the distance to the object to be surveyed, degree of reflection (i.e., intensity of the incident pulses reflected from the object), etc. If individual items of these data are not able to be ascertained, the possibility exists that they are queried from the user by the device, for example, via the operating unit.

As already described above, the automatic selection of the optimum suitable scanning mode is performed on the basis of an optimization with respect to measuring distance, measurement precision, measuring speed, and resolution in consideration of parameters which have been input by the user by means of the operating unit and/or have been automatically ascertained by the device.

In a further preferred embodiment of the invention, the registered measuring signals are analyzed online, i.e., during the scanning, and converted into scanning points for a point cloud. The total scanning duration in this case also includes, in addition to the registration of the measuring signals, the analysis and conversion thereof into scanning points of a point cloud. The measuring signals registered during the scanning arrive for this purpose as raw data in a buffer memory, which is temporary in particular. By means of an analysis unit, the measuring signals are analyzed, i.e., converted according to the selected scanning mode into scanning points for the point cloud and stored in a main memory.

If the scanning procedure was carried out using the scanning mode 2, for example, the distance is thus ascertained 250 times per second from the measuring signals respectively accumulated in 0.004 seconds, the associated spatial angles are determined, and the whole is stored as a scanning point. In this manner, it is possible to achieve very precise measured values for the distance for each scanning point in relation to the measuring distance. A point cloud generated from the scanning points thus ascertained only still requires a fraction of the storage capacity in relation to the storage space which the raw data would occupy in the main memory. The online analysis of the registered measuring point data accelerates the method and additionally allows a representation of the point cloud having the scanning points in the field, i.e., directly at the surveying location, and immediately after the scan. After the measurement, the user thus does not have to wait for the result and the representation as a point cloud. It is also not necessary to transmit the measurement point data registered during the scanning to an external computer unit in order to analyze the data and convert the scanning points for the point cloud, as is frequently the case during post-processing. However, it is not out of the question that the analysis of the registered measurement point data and conversion thereof into scanning points for a point cloud can occur in a post-processing step.

If the total station is equipped with a camera, which can make image recordings of the object to be surveyed, an RGB value assignment to each scanning point can also be performed on the basis of the camera images during the online analysis and the RGB value (color value) can be stored together with the spatial angle data and the distance data for the scanning point in the main memory.

The invention additionally relates to a computer program product having program code which is stored on a machine-readable carrier. The computer program product is configured for controlling and carrying out the scanning to generate a point cloud having scanning points according to an above-described scanning method, in particular when the program is executed on an electronic data processing unit implemented as a control and processing unit of a total station according to the invention.

BRIEF DESCRIPTION OF THE DRAWINGS

The total station according to the invention and the scanning method according to the invention will be described in greater detail hereafter solely as examples on the basis of specific exemplary embodiments schematically shown in the drawings. Further advantages of the invention will also be discussed. Identical elements in the drawings are identified with identical reference signs. In the specific figures:

FIG. 3a shows the object having scanning region from FIG. 2a;

FIGS. 3b-3d show, in a similar representation to FIGS. 2b to 2d, a graphic representation of details of different measuring signal series recorded on the object at constant distance but with different resolution, i.e., with scanning movements of different speeds of the aiming unit or the measuring radiation over a measuring distance of defined length at equal pulse rate and identical analysis and conversion of the measuring signals into scanning points for a point cloud;

FIG. 8 shows a graphic representation of a further possible provision according to the invention of a scanning mode for carrying out a scanning method according to the invention;

FIG. 9 shows a graphic representation of a further possible provision according to the invention of a scanning mode for carrying out a scanning method according to the invention.

DETAILED DESCRIPTION

Figure 1:
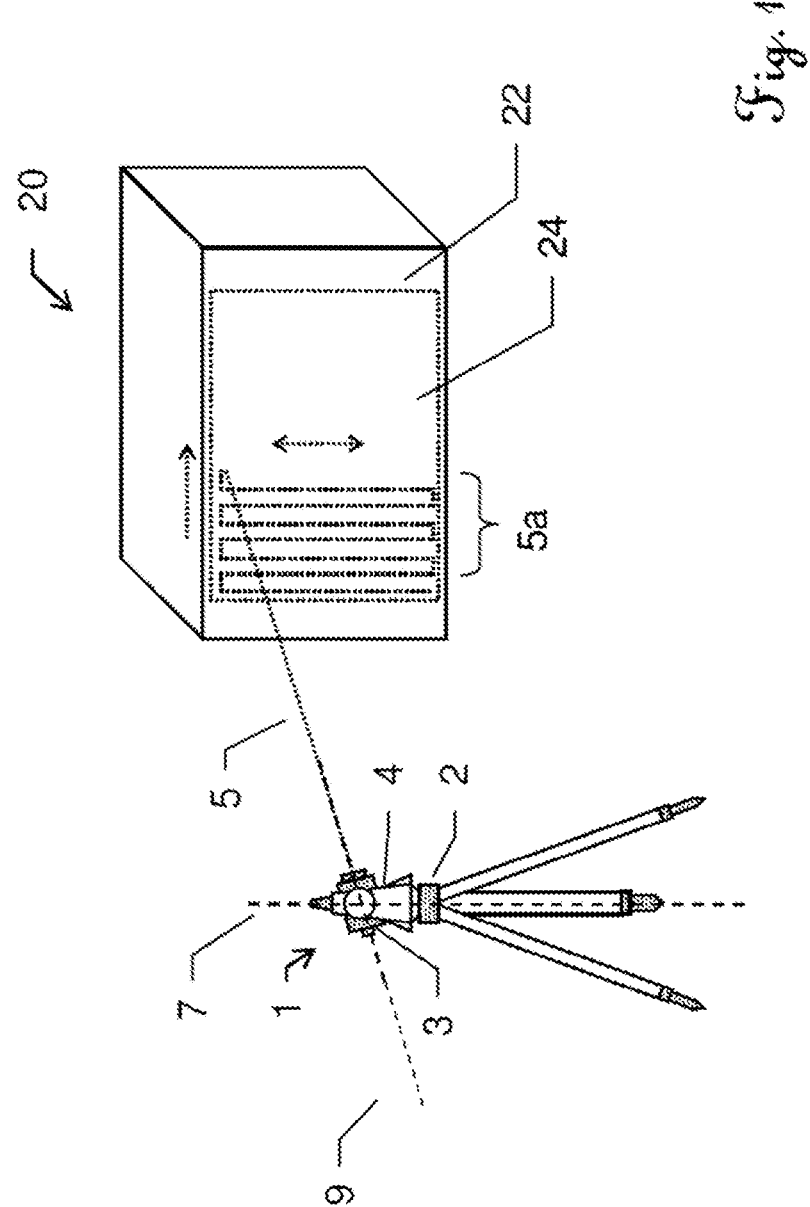
FIG. 1 shows a total station according to the invention and scanning of a surface of an object.

FIG. 1 shows a total station 1 according to the invention having a base 2, a structure 4, which is arranged on the base 2 and is pivotable or rotatable in relation to the base 2 about a pivot axis 7, and an aiming unit 3, which is arranged in the structure 4 and is pivotable or rotatable in relation to the structure 4 about a tilt axis 9, which is perpendicular to the pivot axis 7. The aiming unit 3 is therefore pivotable or rotatable about two axes perpendicular to one another, the pivot axis 7 and the tilt axis 9. Furthermore, the total station 1 comprises a distance measuring unit (not shown), having a laser light source for emitting pulsed measuring radiation 5 and a detector for detecting reflected measuring radiation, which is used for determining the distance between the total station and an object of interest. The measuring radiation 5 is aligned and emitted into the surroundings by means of the aiming unit 3. Via angle encoders (not shown), as are conventionally provided currently in total stations for determining the angular position in pivot axis 7 and tilt axis 9, the angle coordinates for every emitted or reflected measuring pulse of the distance measuring unit are determinable. In addition, an object 20 is shown in FIG. 1, having a surface 22 to be scanned, on which pulsed measuring radiation 5 of the total station 1 has already scanned a part of a scanning region 24 in strips, wherein the scanning movement of the measuring beam 5 on the surface 22 is indicated by a dashed line 5a.

For the scanning of a scanning region 24, the total station 1 has a scanning functionality, during the execution of which by means of the aiming unit 3, the pulsed measuring radiation 5 is emitted, whereby the topography can be surveyed in a fixed scanning region 24 of the surface 22 to be scanned of an object 20. In the example shown here, the scanning region 24 substantially corresponds to the surface 22 to be scanned. By targeted alignment of the aiming unit 3, the pulsed measuring radiation 5 is emitted in such a way that it scans the surface 22 to be scanned with the most continuous possible movement, which allows an increase of the measuring speed in relation to a heretofore typical, step-by-step scanning movement. The movement of the pulsed measuring radiation 5a is oscillating in the example shown here, wherein to simplify the illustration, the oscillating movement 5a of the measuring radiation 5 is only shown for one detail of the surface 22 to be scanned. The oscillating movement 5a of the measuring radiation 5 results in this example by way of an alternation of a continuous vertical alignment and step-by-step horizontal alignment of the emitted pulsed measuring radiation 5 by means of the aiming unit 3. For this purpose, the aiming unit 3 is continuously pivoted up and down in a defined angle range about the tilt axis 9 and respectively pivoted about the pivot axis 7, upon reaching the vertical turning point, in one step by a predefined angle amount in the same direction. The pivot movements of the aiming unit 3 about the pivot axis 7 and about the tilt axis 9 are controlled by means of a control and processing unit 12 of the total station 1.

In addition to the oscillating movement 5a of the pulsed measuring radiation 5 shown in the example, the measuring radiation 5 can also execute any other movement during the execution of the scanning functionality by way of appropriate activation of the aiming unit 3 by means of the control and processing unit 12 in order to register the selected scanning region 24. In particular, the pivoting about both the tilt axis 9 and also about the pivot axis 7 can occur continuously, and the pivoting about the tilt axis 9 can also occur discontinuously instead of the pivoting about the pivot axis 7, as needed. If the scanning region 24 is a horizontal line, for example, a continuous, horizontal alignment of the aiming unit 3 is performed by continuously pivoting the aiming unit 3 in one direction about the pivot axis 7, which is controlled by means of the control and processing unit 12.

For specific requirements, for example, single point measurements or measurements of points spaced far apart from one another or measurements having low resolution, the aiming unit 3 can also be pivoted discontinuously, in particular step-by-step, about both axes 7, 9.

The distance measurement can be carried out by means of pulsed measuring radiation, runtime measurement, and waveform digitizing (WFD), whereby a high measuring rate of 1,000,000 measurements and more per second is possible. Using a phase measurement or a phase measurement with waveform digitizing in the form described here would also be conceivable.

Figure 2:
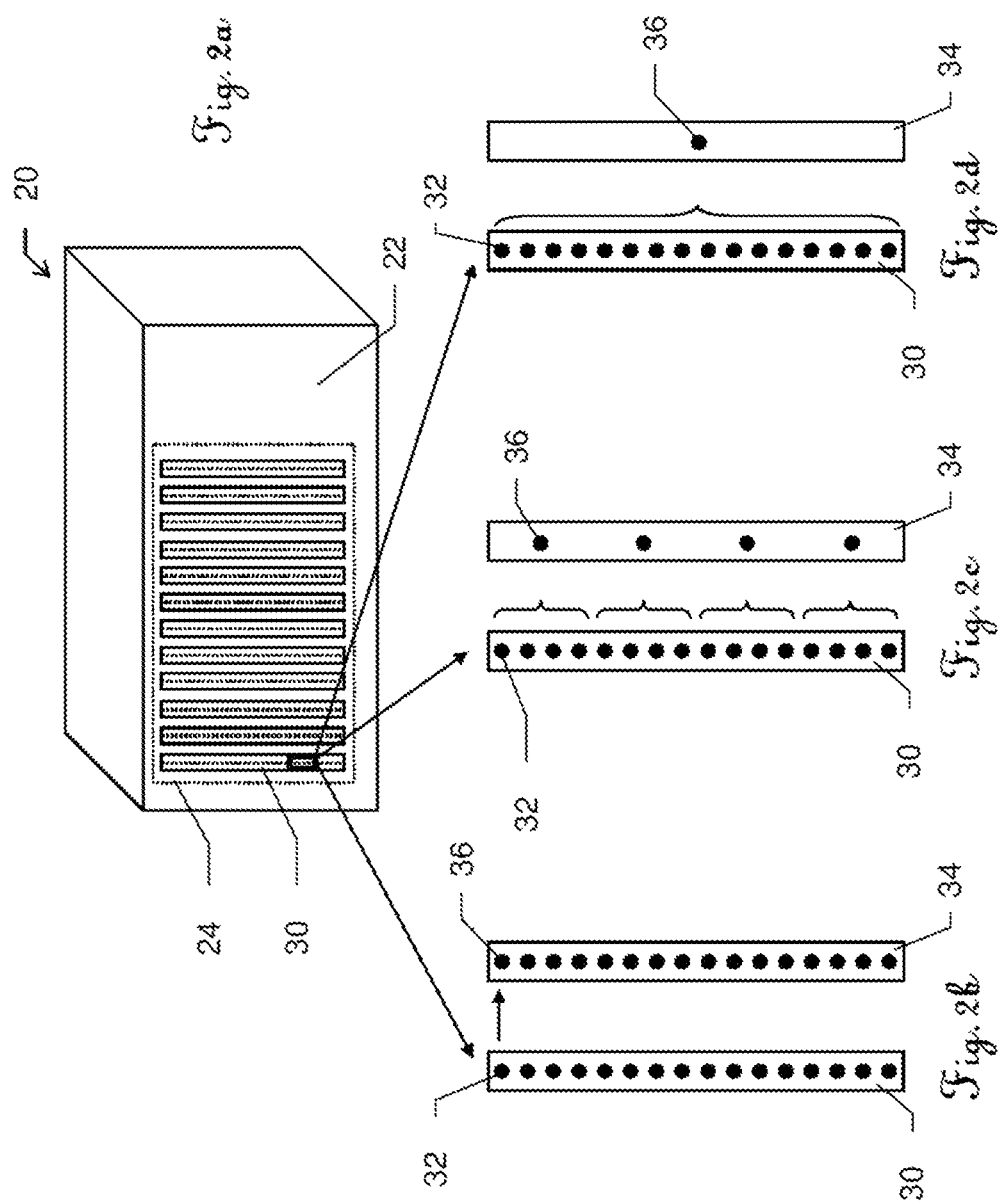
FIG. 2a shows an object having a scanning region sampled by means of measuring signal series, wherein the measuring signal series are stored in a buffer memory for the purpose of analysis.
FIGS. 2b-2d show a graphic representation of the analysis and conversion of respectively one detail of a measuring signal series into a corresponding detail of a scanning point series for a point cloud in different scanning modes, wherein the resolution, i.e., the pulse rate and the scanning movement of the aiming unit or the measuring radiation are constant.

As a result of the scanning, a plurality of measuring signals 32 results, which are stored for the analysis in a buffer memory. In FIG. 2a, an example of a scanning region 24 on a surface 22 to be scanned of an object 20 is shown. The measuring signals 32 can be registered as shown here, for example, in vertical measuring signal series 30, wherein the individual measuring signals 32 are analyzed by means of WFD. The total station 1 has an analysis unit, which respectively ascertains a distance from a number of measuring signals (depending on the selected scanning mode) accumulated in a specific time period and stores it together with the associated spatial angle data as a scanning point 36 in a main memory. The main memory can be a component of the total station 1 (not shown) or can be an external main memory. For example, depending on parameters such as the distance to the object to be scanned and/or requirements of the user, e.g., resolution, measuring distance, measuring speed, or measurement precision, a different number of measuring signals 32 lying in a series in this example can be averaged to obtain a single scanning point 36 for a point cloud, as is graphically represented and explained on the basis of FIGS. 2b to 2c for constant resolution (see below).

Figure 3:
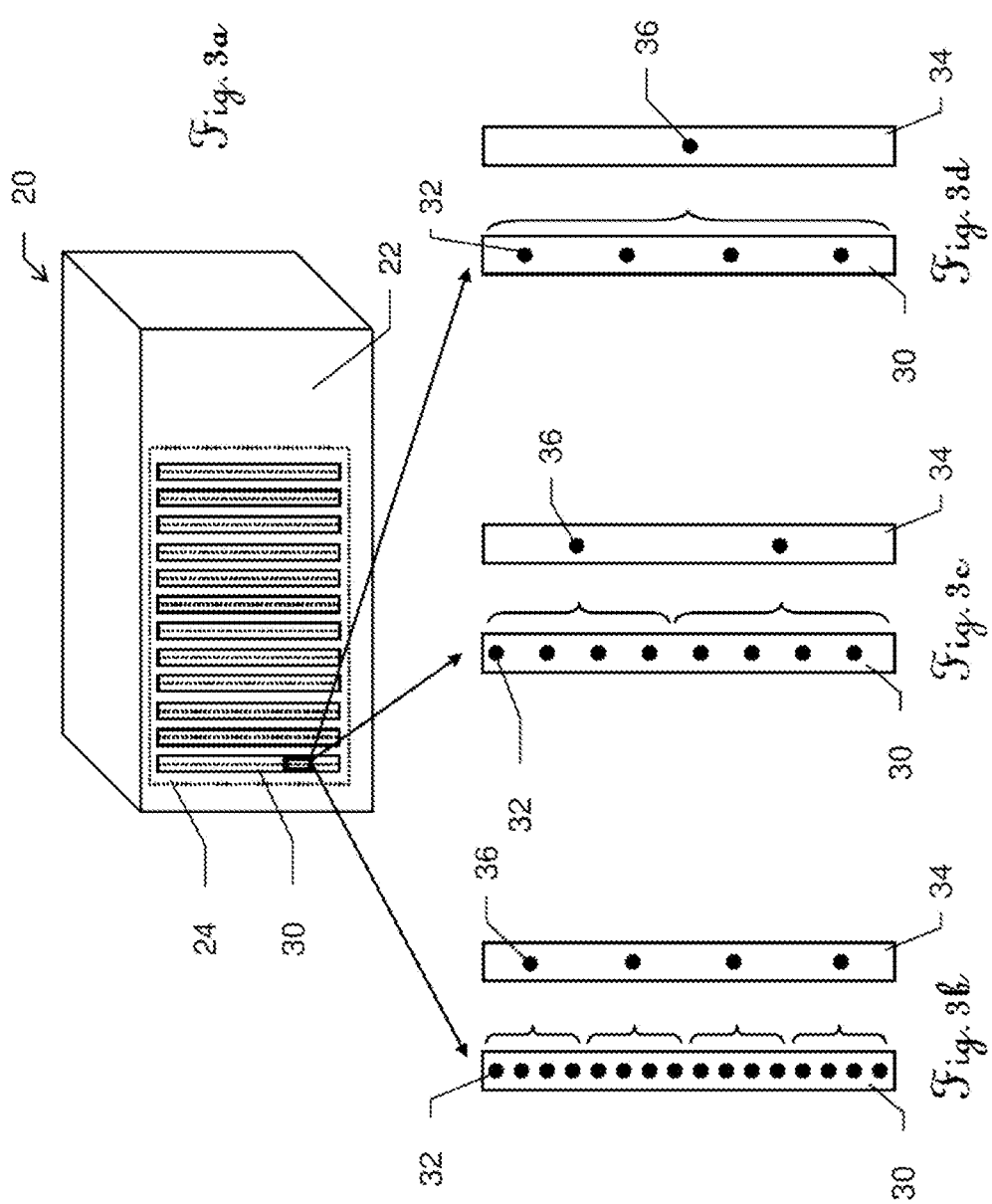

FIG. 3a shows the object 20 having the surface 22, which is to be surveyed in the scanning region 24, from FIG. 2a. However, scanning modes having different resolutions are graphically represented and explained in FIGS. 3b to 3d (see below).

According to the invention, the total station 1 has a program storage unit, which provides at least two different scanning modes. These at least two scanning modes differ at least in their measuring rate, i.e., in the number of measuring signals 32 which are averaged per scanning point 36 or in the time period (0.001 seconds; 0.002 seconds, 0.004 seconds, 0.008 seconds, 0.016 seconds), over which measuring signals 32 are accumulated to ascertain the distance to the object therefrom, or in other words in the number of scanning points 36 which are generated per unit of time.

In the examples of FIGS. 2a-2d, scanning is performed with a constant pulse rate of 1,000,000 laser pulses per second and with constant scanning speed, which is continuous in this example at least in the vertical direction, of the scanning region 24 on the surface 22 of the object 22, which has a surface n of constant distance. In this way, measuring signal series 30 having measuring signals 32 result. Measuring signals of the measuring signal series 30 are now always accumulated over the same time period, which is dependent on the scanning mode, and the distance to the object is ascertained therefrom and the associated spatial angle is assigned to obtain a scanning point 36. Instead of the measuring signal series 30, of course, measuring signal fields of defined geometry and size and therefore a defined number and distribution of measuring signals could also be used to ascertain a scanning point.

FIGS. 2b-2d each show a detail of a measuring signal series 30 with corresponding detail of a scanning point series 34 of a point cloud in the case of differently selected scanning modes.

FIG. 2b shows the result of a first scanning mode (scanning mode 1): The scanning region 24 is registered at a measuring rate of 1000 scanning points per second. This means that for each scanning point 36 at a pulse rate of the emitted measuring radiation of 1,000,000 pulses per second in the ideal case, if all emitted pulses result in a usable measuring signal, 1000 measuring signals 32 are accumulated for the ascertainment of a distance measured value.

FIG. 2c shows the result of a further scanning mode (scanning mode 2), in which the scanning region 24 is registered at a measuring rate of 250 scanning points per second. This means that the number of measuring signals which are accumulated per scanning point for the distance determination is four times higher here at equal pulse rate than in the example from FIG. 2b, which is correspondingly indicated by the number of points which represent measuring signals 32 and are converted into scanning points 36.

FIG. 2d shows the result of a further scanning mode (scanning mode 3), in which the scanning region 24 is registered at a measuring rate of 62 scanning points per second, so that here in the ideal case 16 times the number of measuring signals—compared to scanning mode 1—are accumulated for the ascertainment of the distance. The precision of each individual scanning point 36 is lower in this example than the precision of the scanning points 36 in examples 2c and 2d, because, for the scanning points 36 in the example of FIG. 2b, the smallest number of measuring signals is accumulated for the distance ascertainment over the shortest time period and also at equal, constant pulse rate of the measuring radiation. The required storage capacity in the main memory also advantageously decreases accordingly from example 2b to example 2d.

The angular velocity of the aiming unit is respectively automatically optimized depending on the distance for each scanning mode via an algorithm by the control and processing unit.

FIGS. 3b-3d show, in a similar representation to FIGS. 2b-2d, a graphic representation of details of different measuring signal series 30, recorded on the object 20, at constant distance but with different resolution, i.e., with scanning movements of different speeds of the aiming unit 3 or the measuring radiation 5. For a measuring section of defined length, this means, in the case of respectively equal pulse rate of the emitted measuring radiation, that the number of the measuring signals 32, which are registered by the detector, recorded on this measuring section is lower the faster the scanning movement. In the case of identical analysis and conversion of the measuring signals 32 into scanning points 36 for a point cloud, specifically in the examples 3b to 3d shown here respectively at a measuring rate of 250 scanning points 36 per second or, in other words, an accumulation of measuring signals over time periods of respectively 0.004 seconds, a smaller number of scanning points 36 per measuring section accordingly results for the faster scanning movement, as can be clearly seen in FIGS. 3b to 3d. The speed of the scanning movement of the aiming unit 3 or the measuring radiation 5 is lowest in FIG. 3b and highest in FIG. 3d.

The selection from the scanning modes provided by the program storage unit can either be performed directly by the user or automatically.

FIGS. 4-9 show graphic representations of different possible selection procedures according to the invention of a scanning mode for carrying out a scanning method according to the invention.

Figure 4:
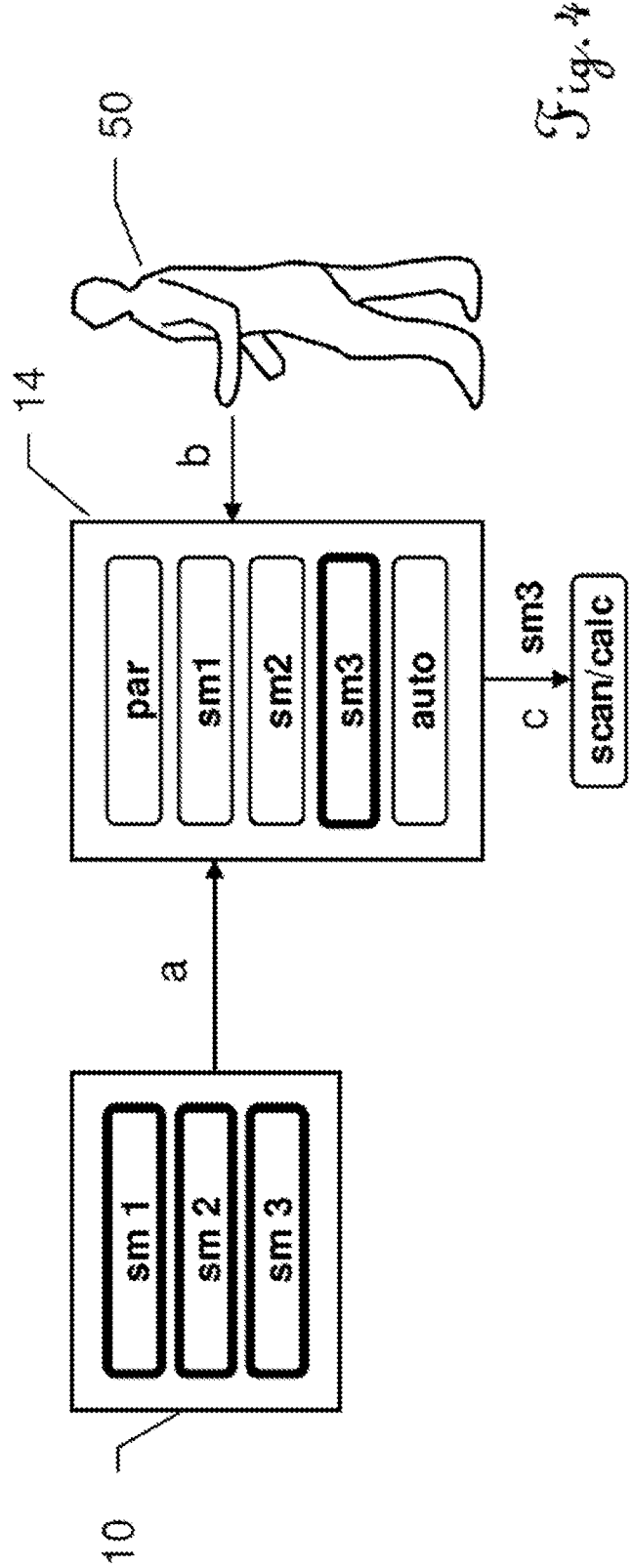
FIG. 4 shows a graphic representation of a first possible provision according to the invention of a scanning mode for carrying out a scanning method according to the invention.

FIG. 4 shows a program storage unit 10, which provides three scanning modes, scanning mode 1 (sm1), scanning mode 2 (sm2), and scanning mode 3 (sm3). A standard scanning region can optionally also be stored in the program storage unit, which can be defined in a manner adapted to the main field of application of the device, and which is respectively accessed by the control and processing unit when another scanning region is not predefined by the user. The information about making available the scanning modes sm1, sm2, and sm3 is transmitted in step a to an operating unit 14, by means of which a user 50 can select a scanning mode from sm1, sm2, and sm3. To assist the user in his choice of the matching scanning mode, items of information about the measuring rate of the scanning mode, the precision of the measurement achievable using the scanning mode, and also about the distance to the object, at which the scanning mode can be reasonably used, are respectively displayed by means of the operating unit when the scanning modes are made available. In step b, the user 50 selects one of the provided scanning modes (in the example shown here sm3) by means of the operating unit 14, for example, by speech input, button press, or by means of a touchscreen.

By means of the operating unit 14, in addition to the selection of a provided scanning mode, the input of at least one parameter (par) and/or the selection of an automatic selection functionality (auto) can also be performed by the user 50. The parameter can be the following: an estimated or measured distance to the object; a pulse rate of the measuring radiation (for example, number of laser pulses of the measuring radiation per second); a scanning region (for example by input of the angular coordinates of the corner points of the scanning region or a starting coordinate and length and width specifications proceeding therefrom); a measuring speed (for example, input of the angular velocity of the scanning movement or, in combination with an input or measurement of the distance to the object, an input of cm/s or m/s), wherein the measuring speeds azimuth (pivot axis) and vertical (tilt axis) are settable independently of one another; a resolution (for example, scanning point density per scanned surface region), or, for example, an absolute scanning duration (=total scanning duration) in combination with the desired scanning region or the standard scanning region. The input of the desired measuring rate is also possible, wherein the measurement precision or the maximum distance to the object which is still reasonably measurable at this measuring rate is then ascertained by the control and processing unit, and these items of information are made available to the user via the operating unit. The information about the selection of the scanning mode and—if a parameter input has been performed (not shown)—the input parameters are then transmitted to the control and processing unit (not shown), whereby in step c, the scanning functionality (scan) of the total station 1 or the alignment of the aiming unit 3 and the analysis (calc) are carried out in accordance with the selected scanning mode sm3. The angular velocity of the aiming unit is automatically optimized respectively depending on the distance for the selected scanning mode via an algorithm by the control and processing unit. For the execution of the scanning mode, the control and processing unit accesses the scanning mode sm3 stored in the program storage unit 10. This can be performed in that the entire control and analysis program stored as the scanning mode sm3 is loaded into the internal memory of the control and processing unit, or in that at least the program parts which run rapidly are loaded into the internal memory. A configuration is also possible, but sometimes less suitable for rapid scans, in which the control and processing unit acquires all required items of information continuously from the program storage unit without loading the program or parts of the program "scanning mode sm3" into an internal memory.

Figure 5:
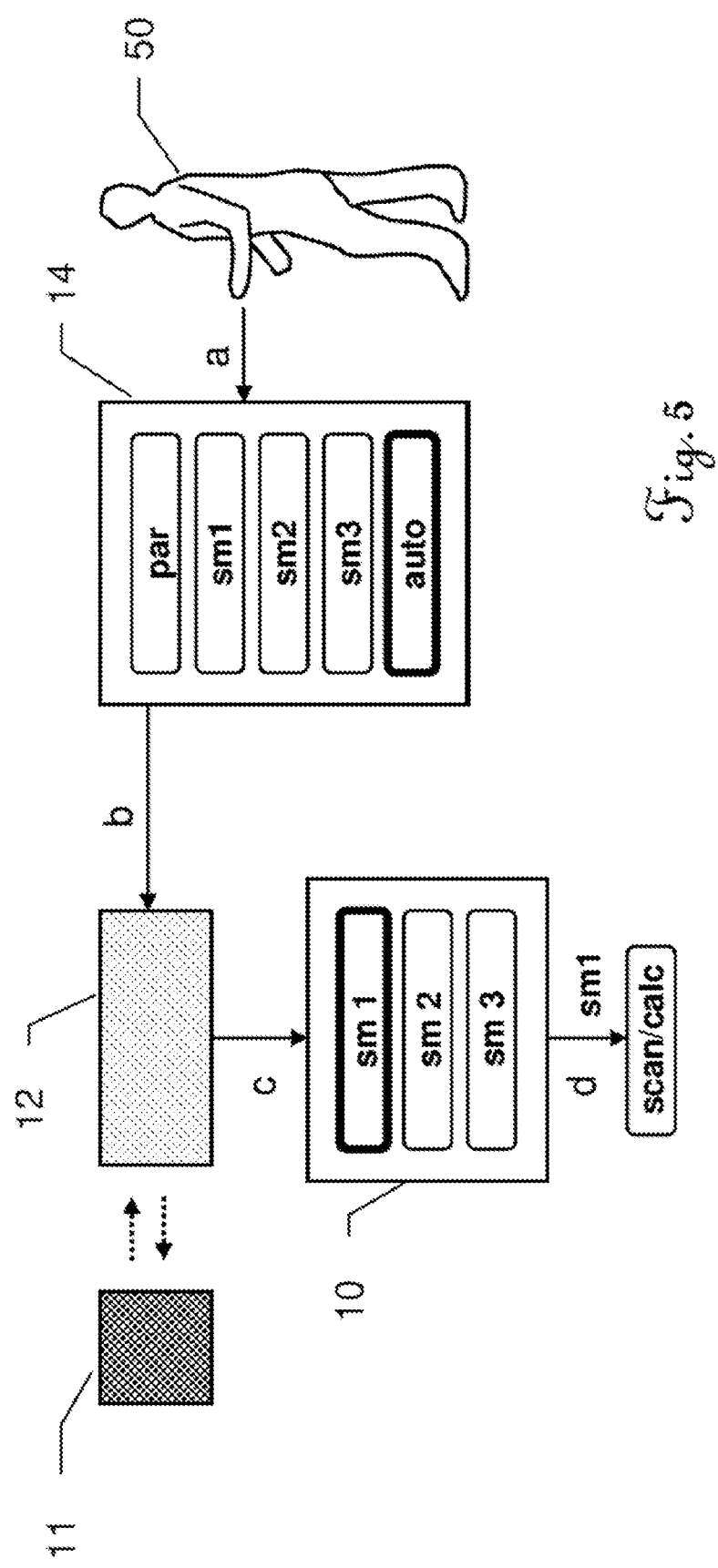
FIG. 5 shows a graphic representation of a further possible provision according to the invention of a scanning mode for carrying out a scanning method according to the invention.

FIG. 5 shows a graphic representation of a further possible selection procedure according to the invention of a scanning mode for carrying out a scanning method according to the invention. In step a, the user 50 selects the automatic selection functionality by means of the operating unit 14. This means that the selection of the optimum suitable scanning mode in conjunction with the standard scanning region for carrying out the scanning functionality of the total station 1 is performed automatically by means of the control and processing unit 12. For this purpose, the information about the selection of the automatic selection functionality is transmitted in step b to the control and processing unit 12. The control and processing unit 12 controls the ascertainment of parameters required for the selection of the suitable scanning mode, for example, the measurement of the distance to the object by means of a distance measuring unit 11 in an individual measurement or coarse scan, wherein the distance measuring unit 11 is activated by means of the control and processing unit 12 and the distance to the object ascertained by means of the distance measuring unit 11 is transmitted to the control and processing unit 12 (indicated by the dotted arrows). The distance measurement by means of the distance measuring unit 11 can be performed before or during the scanning. Depending on the ascertained parameters, in step c, the optimum suitable scanning mode (in the example shown here sm1) is selected from the scanning modes sm1, sm2, and sm3 provided by the program storage unit 10 by means of the control and processing unit 12. The term "optimum suitable scanning mode" is to be understood in this context as the scanning mode, using which, in consideration of the determined parameter or parameters, the best possible, i.e., optimum scanning result is achievable with respect to measuring distance, measuring speed, measurement precision, and resolution. The information about the selection of the scanning mode is then transmitted to the control and processing unit (not shown) and optionally displayed to the user via the operating unit 14. In step d, in accordance with the scanning mode recognized as optimum, the scanning functionality (scan) of the total station 1 or the alignment of the aiming unit 3 and the analysis (calc) are then carried out according to the selected scanning mode sm1.

Figure 6:
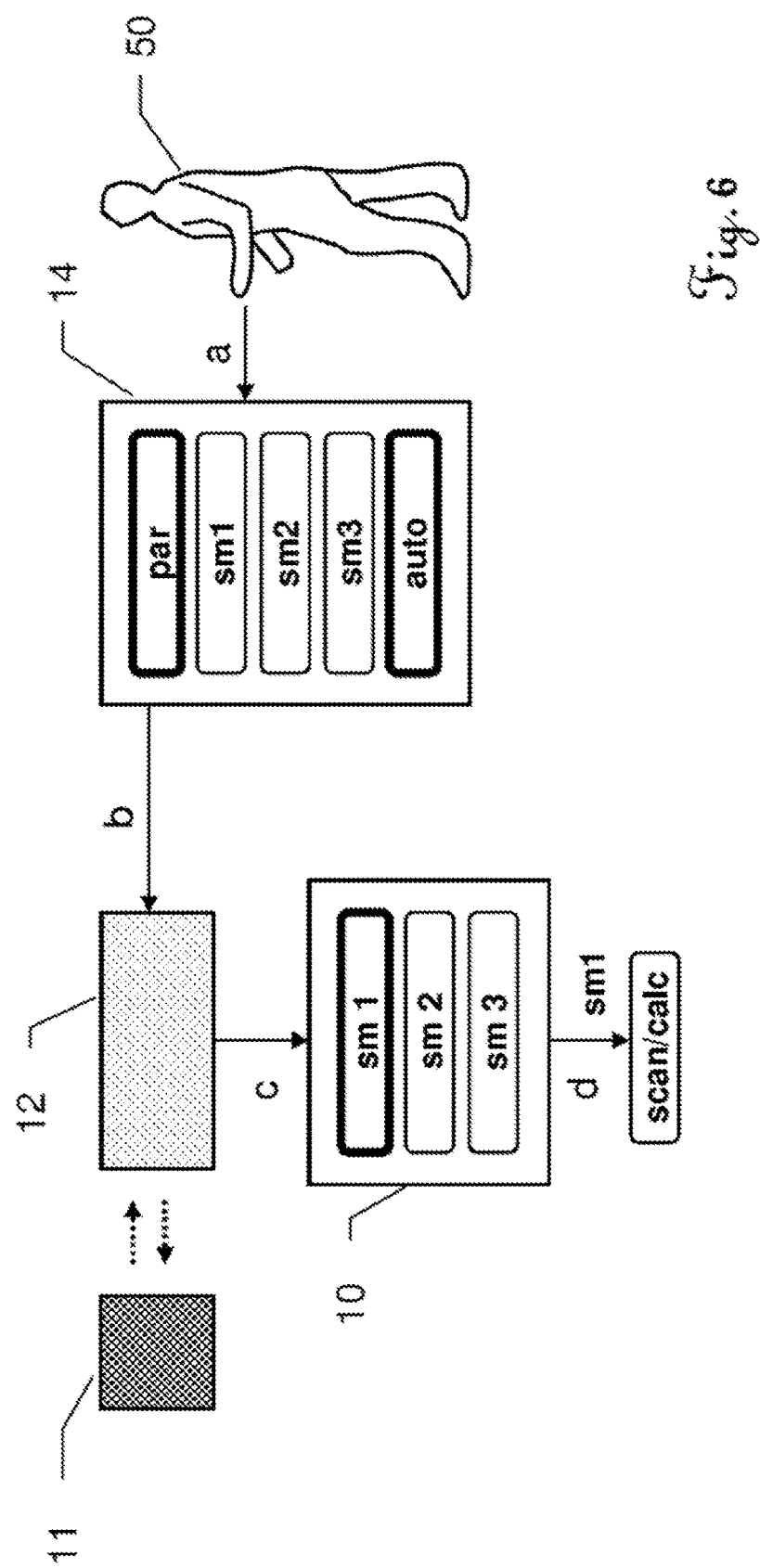
FIG. 6 shows a graphic representation of a further possible provision according to the invention of a scanning mode for carrying out a scanning method according to the invention.

FIG. 6 shows a graphic representation of a further possible selection procedure according to the invention of a scanning mode for carrying out a scanning method according to the invention. In step a, the user 50 selects the automatic selection functionality by means of the operating unit 14 and additionally inputs at least one of the following parameters by means of the operating unit 14: an estimated or measured distance to the object, a pulse rate of the measuring radiation, a scanning region, a measuring speed, a resolution, or a scanning duration. The information about the selection of the automatic selection functionality and the at least one input parameter is transmitted in step b to the control and processing unit 12. Depending on the at least one parameter, the control and processing unit 12 controls the ascertainment of further parameters required for the selection of the suitable scanning mode if necessary. For example, if a specific resolution was input by the user 50, it can thus be necessary for the selection of the suitable scanning mode to additionally carry out a measurement of the distance to the object by means of the distance measuring unit 11, as already described for FIG. 4. Based on the available parameters (input by the user and optionally automatically ascertained by the device), in step c, the optimum suitable scanning mode (in the example shown here scanning mode 1) is selected by means of the control and processing unit 12 from the scanning modes sm1, sm2, and sm3 provided by the program storage unit 10. The scanning functionality (scan) of the total station 1 or the alignment of the aiming unit 3 and the analysis (calc) are carried out corresponding to the selected scanning mode sm1 accordingly in step d.

Figure 7:
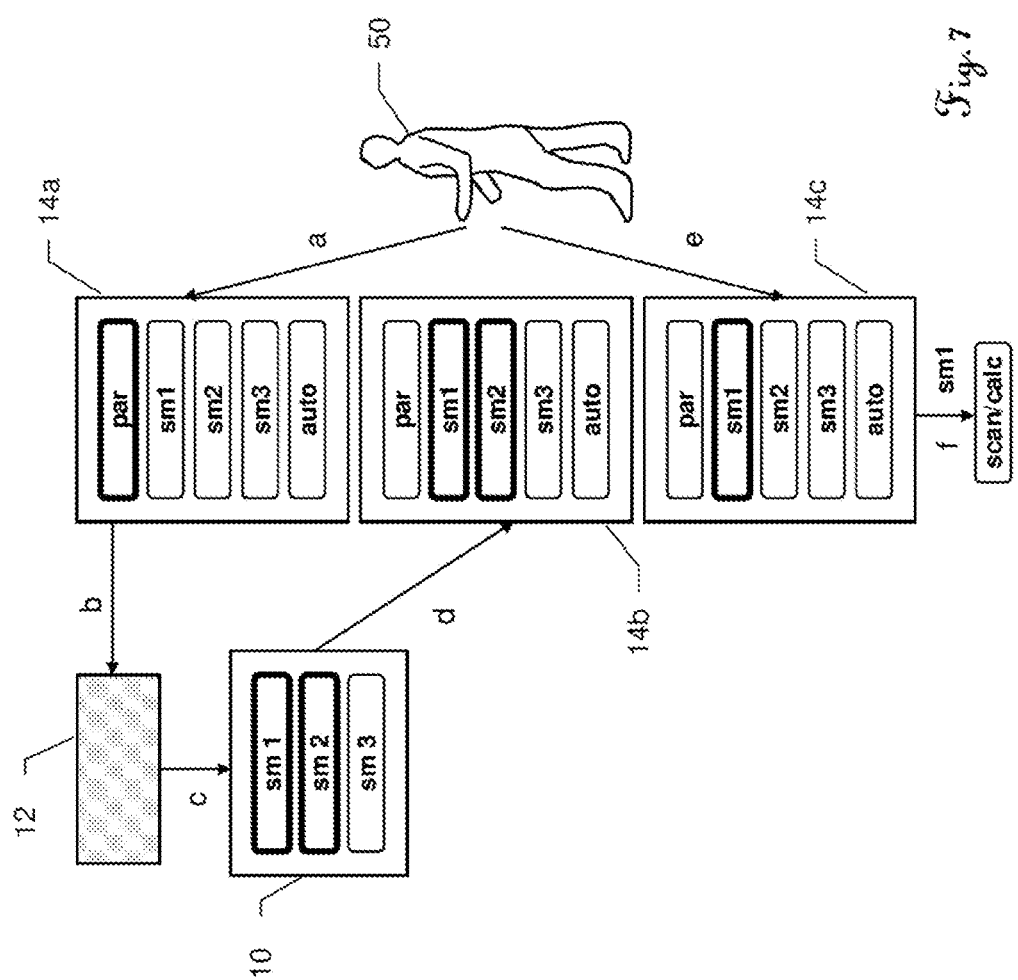
FIG. 7 shows a graphic representation of a further possible provision according to the invention of a scanning mode for carrying out a scanning method according to the invention.

FIG. 7 shows a graphic representation of a further possible provision according to the invention of a scanning mode for carrying out a scanning method according to the invention. For the purpose of better recognizability, the operating unit 14 is respectively shown separately in this representation for the various steps a, b and d and e, f and identified with 14a, 14b, 14c, wherein this is always the same operating unit 14, of course. In step a, the user 50 inputs at least one of the parameters already listed in the description of FIG. 5 by means of the operating unit 14a. The at least one parameter is transmitted in step b to the control and processing unit 12. Depending on the at least one parameter, reasonably usable scanning modes (in the example shown here scanning modes 1 and 2) are selected in step c by means of the control and processing unit 12 from the scanning modes sm1, sm2, and sm3 provided by the program storage unit 10 and are made available in step d to the user 50 via the operating unit 14b. The term "reasonable scanning mode" is to be understood in this context as a scanning mode using which, in consideration of the at least one parameter, a satisfactory scanning result is achievable, i.e., a scanning result having a sufficient measurement precision and/or resolution. In step e, the user 50 selects one of the scanning modes made available (in the example shown here scanning mode 1) by means of the operating unit 14c. The information about the selection of the scanning mode is then transmitted to the control and processing unit (not shown), whereby in step f, the scanning functionality (scan) of the total station 1 or the alignment of the aiming unit 3 and the analysis (calc) are carried out in accordance with the selected scanning mode sm1.

FIG. 8 shows, similarly to the illustration in FIG. 7, a graphic representation of a further possible provision according to the invention of a scanning mode for carrying out a scanning method according to the invention. In step a, the user 50 inputs at least one of the parameters already listed in the description of FIG. 5 by means of the operating unit 14a. The at least one parameter is transmitted in step b to the control and processing unit 12. Depending on the at least one parameter in step c, the reasonable scanning modes (in the example shown here scanning modes 1 and 2) are selected by means of the control and processing unit 12 from the scanning modes sm1, sm2, and sm3 provided by the program storage unit and made available together with the automatic selection functionality auto in step d to the user 50 via the operating unit 14b. In step e, the user 50 selects the automatic selection functionality by means of the operating unit 14c. The information about the selection of the automatic selection functionality is transmitted in step f to the control and processing unit 12. In consideration of the at least one parameter input in step a by the user, if necessary, the control and processing unit 12 controls the ascertainment of further parameters necessary for the selection of the suitable scanning mode. Based on the available parameters (input by the user and optionally automatically ascertained by the device), the optimum suitable scanning mode (in the example shown here scanning mode 2) is selected in step g by means of the control and processing unit 12 from the scanning modes sm1 and sm2 made available by the program storage unit 10b. In step h, the scanning functionality (scan) of the total station 1 or the alignment of the aiming unit 3 and the analysis (calc) are carried out in accordance with the selected scanning mode sm2.

FIG. 9 shows, similarly to the illustration in FIG. 7, a graphic representation of a further possible provision according to the invention of a scanning mode for carrying out a scanning method according to the invention. Before the scanning, a distance measurement to the object to be surveyed is carried out by means of the distance measuring unit 11, as explained for FIG. 4. Depending on the measured distance, in step a, the reasonable scanning modes (in the example shown here scanning modes 1 and 2) are selected by means of the control and processing unit 12 from the scanning modes sm1, sm2, and sm3 provided by the program storage unit 10 and made available in step b to the user 50 via the operating unit 14a. In step c, the user 50 selects one of the available scanning modes (in the example shown here scanning mode 2) by means of the operating unit 14b. The information about the selection of the scanning mode is then transmitted to the control and processing unit (not shown), whereby in step d the scanning functionality (scan) of the total station 1 or the alignment of the aiming unit 3 and the analysis (calc) are carried out in accordance with the selected scanning mode sm2.

In the above-mentioned embodiments, various details have been shown and/or described individually or in combination with one another as examples. However, this does not mean that they can only be combined with one another in the form shown and/or described. A person skilled in the art knows the way in which details of the embodiments of the invention shown and/or described above may be reasonably combined with one another, although not all combinations could be described here for reasons of space.

What is claimed is:
1. A total station comprising:
a base;
a structure arranged on the base and pivotable in relation to the base about a pivot axis;
an aiming unit arranged in the structure and pivotable in relation to the structure about a tilt axis perpendicular to the pivot axis;
an angle measuring unit;
a control and processing unit;
an electro-optical distance measuring unit for measuring the distance to points on an object, wherein the distance measuring unit includes an emission unit that emits pulsed measuring radiation, which can be emitted using the aiming unit, and a detector for receiving the measuring radiation reflected at the points on the object, which registers the received measuring radiation in the form of measuring signals;
a scanning functionality, which is controllable by the control and processing unit in such a manner using the distance measuring unit, a distance measurement to points on an object is executable in a scanning manner and registered measuring signals are analyzed using an analysis unit and convertible into scanning points, wherein a distance to the object can be ascertained for each scanning point from the measuring signals with assignment of two spatial angles, so that a point cloud which represents the object can be generated from the scanning points,
wherein
the electro-optical distance measuring unit uses runtime measurement and waveform digitizing (WFD) to carry out a distance measurement, and the total station has a program storage unit which provides at least two scanning modes, wherein the at least two scanning modes differ at least in their measuring rate,
wherein, in the scope of a scanning functionality, an aiming unit is pivotable about a tilt axis and/or pivot axis in such a manner that emitted, pulsed measuring radiation is continuously aligned at least in a pivotable manner about one of two axes, so that blurring of incident and reflected pulses on a surface of an object result in blurring signals, wherein the WFD provides at least a partial compensation of these blurred signals by providing an improved ability to analyze these blurred signals.
2. The total station according to claim 1, wherein at least two scanning modes are provided by the program storage unit and are selected from the group consisting of:
scanning mode 0 having a measuring rate of 100,000 scanning points per second,
scanning mode 1 having a measuring rate of 1000 scanning points per second,
scanning mode 2 having a measuring rate of 250 scanning points per second,
scanning mode 3 having a measuring rate of 62 scanning points per second, and
scanning mode 4 having an automatic adaptation of the measuring rate to the currently measured distance to the object.

3. The total station according to claim 1, further comprising an operating unit for the input of at least one parameter, wherein the parameter includes at least one of the following: an estimated or measured distance to the object, a pulse rate of the measuring radiation, a scanning region, an angular velocity of the aiming unit, a resolution, or a total scanning duration.

4. The total station according to claim 1, further comprising an operating unit for the selection of a scanning mode and/or an automatic selection functionality by the user.

5. The total station according to claim 1, wherein a scanning mode from the at least two scanning modes is selected manually by a user.

6. The total station according to claim 1, wherein a scanning mode from the at least two scanning modes is selected automatically by the control and processing unit.

7. The total station according to claim 1, wherein the control and processing unit is configured to provide at least one scanning from the at least two scanning modes provided by the program storage unit, wherein the at least one scanning is provided based on at least one parameter input from the operating unit.

8. The total station according to claim 1, wherein the measuring rate comprises a number of scanning points obtained per unit of time.

9. A method for generating a point cloud having scanning points using the total station according to claim 1, the method comprising:
providing the at least two scanning modes;
receiving a selection of a scanning mode from the at least two scanning modes; and
executing the scanning mode.

10. The method according to claim 9, wherein the at least two scanning modes are selected from the group consisting of:
scanning mode 0 having a measuring rate of 100,000 scanning points per second,
scanning mode 1 having a measuring rate of 1000 scanning points per second,
scanning mode 2 having a measuring rate of 250 scanning points per second,
scanning mode 3 having a measuring rate of 62 scanning points per second, and
scanning mode 4 having an automatic adaptation of the measuring rate to the currently measured distance to the object.

11. The method according to claim 9, wherein the receiving a selection of a scanning mode from the at least two scanning modes is performed at least in part by a user.

12. The method according to claim 9, further comprising:
before the scanning, performing a distance measurement to at least one point on an object in the form of a single point measurement or a pre-scan;
selecting at least one scanning mode from the at least two scanning modes by the control and processing unit depending at least on the distance measurement and is made available to a user; and
receiving a selection of a scanning mode from the at least one available scanning mode from the user.

13. The method according to claim 9, further comprising:
before the scanning, performing a distance measurement to at least one point on an object in the form of a single point measurement or a pre-scan;
selecting at least one scanning mode from the at least two scanning modes by the control and processing unit depending at least on the distance measurement and is made available to a user; and
receiving an instruction from the user for the automatic selection of a scanning mode, and
selecting an optimum suitable scanning mode from the at least one available scanning mode using the control and processing unit, wherein the selecting of the optimum suitable scanning mode is performed on the basis of an optimization with respect to distance to at least the object, total measuring duration, measurement precision, and resolution.

14. The method according to claim 9, further comprising:
before the scanning, receiving at least one parameter, wherein the parameter is selected from the group consisting of: an estimated or measured distance to the object, a pulse rate of the measuring radiation, a scanning region, an angular velocity of the aiming unit, a resolution, and a total scanning duration;
selecting at least one scanning mode from the at least two scanning modes by the control and processing unit, which is made available to a user, depending at least on the at least one parameter; and
receiving a selection of a scanning mode from the at least one available scanning mode from the user.

15. The method according to claim 9, further comprising:
before the scanning, receiving at least one parameter, wherein the parameter is selected from the group consisting of: an estimated or measured distance to the object, a pulse rate of the measuring radiation, a scanning region, an angular velocity of the aiming unit, a resolution, and a total scanning duration;
selecting at least one scanning mode from the at least two scanning modes by the control and processing unit, which is made available to a user, depending at least on the at least one parameter; and
receiving an instruction from the user for the automatic selection of a scanning mode; and
selecting an optimum suitable scanning mode from the at least one available scanning mode using the control and processing unit, wherein the selecting of the optimum suitable scanning mode is performed on the basis of an optimization with respect to distance to at least the object, total measuring duration, measurement precision, and resolution.

16. The method according to claim 9, wherein
selecting one optimum suitable scanning mode, depending on the current distances measured during the scanning, using the control and processing unit from the scanning modes provided by the program storage unit and is used for scanning,
wherein the selection of the optimum suitable scanning mode is performed on the basis of an optimization of the scanning with respect to distance to the object, total measuring duration, measurement precision, and resolution.

17. The method according to claim 9, further comprising:
analyzing the registered measuring signal data during the scanning; and
converting the registered measuring into scanning points for a point cloud.

18. A non-transitory computer program product having program code which is stored on a machine-readable carrier, for controlling and carrying out the method for generating a point cloud having scanning points according to claim 9.

* * * * *